(12) United States Patent
Biery, II et al.

(10) Patent No.: US 11,470,767 B2
(45) Date of Patent: *Oct. 18, 2022

(54) SEED DEPTH AUTO-LEARN SYSTEM ASSOCIATED WITH A SEED DEPTH DEVICE FOR AN AGRICULTURAL PLANTER

(71) Applicant: Steering Solutions IP Holding Corporation, Saginaw, MI (US)

(72) Inventors: Addney T. Biery, II, Clio, MI (US); Brian G. Maust, Unionville, MI (US); Timothy A. Rohn, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/136,421

(22) Filed: Dec. 29, 2020

(65) Prior Publication Data

US 2021/0112702 A1    Apr. 22, 2021

Related U.S. Application Data

(63) Continuation of application No. 16/697,791, filed on Nov. 27, 2019, now Pat. No. 10,912,250, which is a
(Continued)

(51) Int. Cl.
*G06F 7/70* (2006.01)
*A01C 7/20* (2006.01)
(Continued)

(52) U.S. Cl.
CPC ............ *A01C 7/203* (2013.01); *A01B 79/00* (2013.01); *A01C 7/205* (2013.01); *A01C 19/02* (2013.01);
(Continued)

(58) Field of Classification Search
CPC ......... A01C 7/203; A01C 7/205; A01C 19/02; A01B 79/00; G05D 1/0219
See application file for complete search history.

(56) References Cited

U.S. PATENT DOCUMENTS

| 2013/0081002 A1* | 3/2013 | Kalman | ..................... G06F 8/51 717/132 |
| 2015/0230391 A1* | 8/2015 | Houck | ................... A01C 7/203 701/50 |
| 2017/0280617 A1* | 10/2017 | Biery, II | ................ A01C 7/203 |

FOREIGN PATENT DOCUMENTS

DE          10238685 A1 *  3/2004  ............. A01B 49/06

* cited by examiner

*Primary Examiner* — Adam M Alharbi
(74) *Attorney, Agent, or Firm* — Dickinson Wright PLLC (57) ABSTRACT

A seed depth device for an agricultural planter includes an electric motor. The seed depth device also includes an actuator driven by the electric motor and arranged to move to a home position. The seed depth device further includes a first stop proximate to the actuator when in the home position. The seed depth device yet further includes at least one controller including a computing processor and a computer readable storage medium configured to control the electric motor. The seed depth device also includes a seed depth auto-learn system at least in-part stored and executed by the at least one controller, the seed depth auto-learn system configured to learn the home position based at least in-part on the actuator stalling upon the first stop, wherein the seed depth auto-learn system is configured to move the actuator a prescribed distance away from the first stop to establish the home position.

12 Claims, 7 Drawing Sheets

Related U.S. Application Data continuation of application No. 16/144,200, filed on Sep. 27, 2018, now Pat. No. 10,609,859, which is a continuation of application No. 15/474,612, filed on Mar. 30, 2017, now Pat. No. 10,111,376.

(60) Provisional application No. 62/315,256, filed on Mar. 30, 2016.

(51) Int. Cl.
*A01B 79/00* (2006.01)
*A01C 19/02* (2006.01)
*G05D 1/02* (2020.01)

(52) U.S. Cl.
CPC ... *G05D 1/0219* (2013.01); *G05D 2201/0201* (2013.01)

SEED DEPTH AUTO-LEARN SYSTEM ASSOCIATED WITH A SEED DEPTH DEVICE FOR AN AGRICULTURAL PLANTER

CROSS-REFERENCES TO RELATED APPLICATIONS

This patent application is a continuation of U.S. patent application Ser. No. 16/697,791, filed Nov. 27, 2019, which is a continuation of U.S. patent application Ser. No. 16/144,200, filed Sep. 27, 2018, which is a continuation of U.S. patent application Ser. No. 15/474,612, filed Mar. 30, 2017, which claims the benefit of U.S. Provisional Patent Application No. 62/315,256, filed Mar. 30, 2016, the disclosure of each of which are incorporated herein by reference in their entirety.

BACKGROUND

The present disclosure relates to seed depth devices of agricultural planters, and more particularly, to a seed depth auto-learn system associated with the seed depth device.

Agricultural planters, may include a multitude of motorized devices such as down force devices, seed plate devices, and seed depth devices. Each device may include a computer-based controller, a motor, and an actuator. The controller may be configured to store various operating parameters and other data to properly operate the motor to drive the actuator. With regard to seed depth devices, the controller may need to know such parameters as an actuator home position, an actuator full extension position, full actuator travel distance, and others.

During, for example, maintenance operations of the seed depth device, adjustment of the actuator may be required to achieve the correct home position. Typically, such adjustments to the seed depth device are performed manually. Unfortunately, manual adjustments are prone to human error and inconsistencies, and may require considerable resources and time.

SUMMARY OF THE DISCLOSURE

In one embodiment of the present disclosure, a seed depth device for an agricultural planter includes an electric motor. The seed depth device also includes an actuator driven by the electric motor and arranged to move to a home position. The seed depth device further includes a first stop proximate to the actuator when in the home position. The seed depth device yet further includes at least one controller including a computing processor and a computer readable storage medium configured to control the electric motor. The seed depth device also includes a seed depth auto-learn system at least in-part stored and executed by the at least one controller, the seed depth auto-learn system configured to learn the home position based at least in-part on the actuator stalling upon the first stop, wherein the seed depth auto-learn system is configured to move the actuator a prescribed distance away from the first stop to establish the home position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, FIGS. 1-6 describe various embodiments of a seed depth planter system of an agricultural planter configured to auto-learn a seed depth position.

Figure 1:
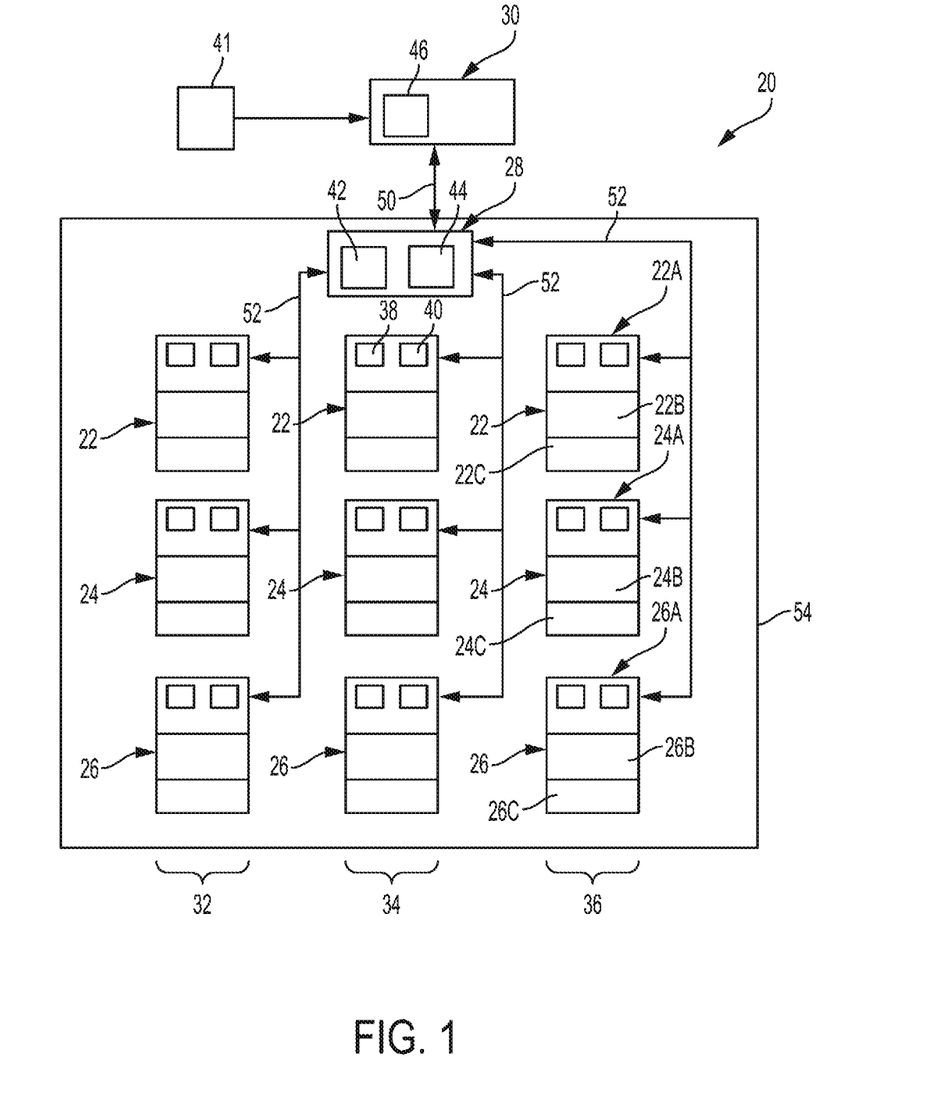
FIG. 1 is a schematic of an agricultural planter.

Referring to FIG. 1, an agricultural planter 20 (i.e., farming equipment) may include at least one down force device 22, at least one seed plate device 24, at least one seed depth device 26, a master controller 28, and a user interface 30. The devices 22, 24, 26 may each serve separate and distinct functions toward overall operation of the agricultural planter 20. The devices 22, 24, 26 may generally be distributed in at least one row (i.e., three illustrated as 32, 34, 36) with each row having at least one of each device 22, 24, 26.

The down force device 22 may include a controller 22A, an electric motor 22B that may be brushless, and an actuator 22C that may be mechanical. The seed plate device 24 may include a controller 24A, an electric motor 24B that may be brushless, and an actuator 24C that may be mechanical. The seed depth device 26 may include a controller 26A, an electric motor 26B that may be brushless, and an actuator 26C that may be mechanical. Each motor 22B, 24B, 26B may be the same type of motor having the same or similar manufacturer specifications (i.e., same rated horse power, same rated speed, etc.). However, through wear and/or manufacturing tolerances, the motors 22B, 24B, 26B, and/or a new replacement motor for use in any of the motorized devices 22, 24, 26, may have undesired, different, operating characteristics. The differing operating characteristics may be associated with such factors as electrical coil resistance, magnetic strength, commutation sensor attributes, and others. In one, non-limiting, embodiment, the motors 22B, 24B, 26B may be three-phase, brushless, motors.

The actuators 22C, 24C, 26C may be different from one-another performing different functions, thus having different operating parameters that may generally be controlled by the respective controllers 22A, 24A, 26A. It is understood that the devices 22, 24, 26 including the associated actuators may be commonly known by one having skill in the art of agricultural planters.

Each controller 22A, 24A, 26A of the respective motorized devices 22, 24, 26 may include a computing processor 38 (e.g., microprocessor) and a storage medium 40 that may be computer writeable and readable. The controllers 22A, 24A, 26A may store operating parameters of the respective motors 22B, 24B, 26B, operating characteristics of the respective motors 22B, 24B, 26B, operating parameters of the respective actuators 22C, 24C, 26C, maintenance history, operation history, and other data. Data may be collected automatically through execution of software, may be pre-programmed into the storage mediums 40, and/or may be entered by a user via the user interface 30, and assistance via use of any variety of electronic readers 41 (e.g., bar code reader).

Similarly, the master controller 28 may include a computing processor 42 (e.g., microprocessor) and a storage medium 44 that may be computer writeable and readable. In one embodiment, the master controller 28 is configured to handle higher order tasks relative to the tasks of the controllers 22A, 24A, 26A. In one embodiment, the user interface 30 may communicate directly with the master controller 28, that in-turn communicates with the controllers 22A, 24A, 26A. For example, the user interface 30 may display user prompts commanded by the master controller 28, and through the user interface, the master controller 28 may assist a user in the use of the reader 41 and downloading of data therefrom. The user interface 30 may include a display screen 46 that may be interactive for conveying information, and/or prompting a user to make various selections.

A communication pathway 50 may extend between the master controller 28 and the user interface 30, and may be hardwired or wireless. In one embodiment, the user interface 30 may be an integral part of the master controller 28 (i.e., physically located with the master controller 28). In another embodiment, the user interface 30 may be mobile (e.g., tablet, smart phone, and others).

Communication pathways 52 may extend between the master controller 28 and each controller 22A, 24A, 26A, and may be hardwired or wireless. In one embodiment, the master controller 28 and the motorized devices 22, 24, 26 may be mounted to a common support structure 54 of the machine 20 and the pathways 52 may thus be hardwired for robust communications. It is further contemplated and understood that other configurations of the controllers 22A, 24A, 26A, 28 are plausible. For example, the master controller 28 may be configured to include the functions of the controllers 22A, 24A, 26A. Alternatively, each row 32, 34, 36 may generally include only one, respective, controller configured to control the functions and store various parameters of the devices 22, 24, 26 for the respective row.

Figure 2:
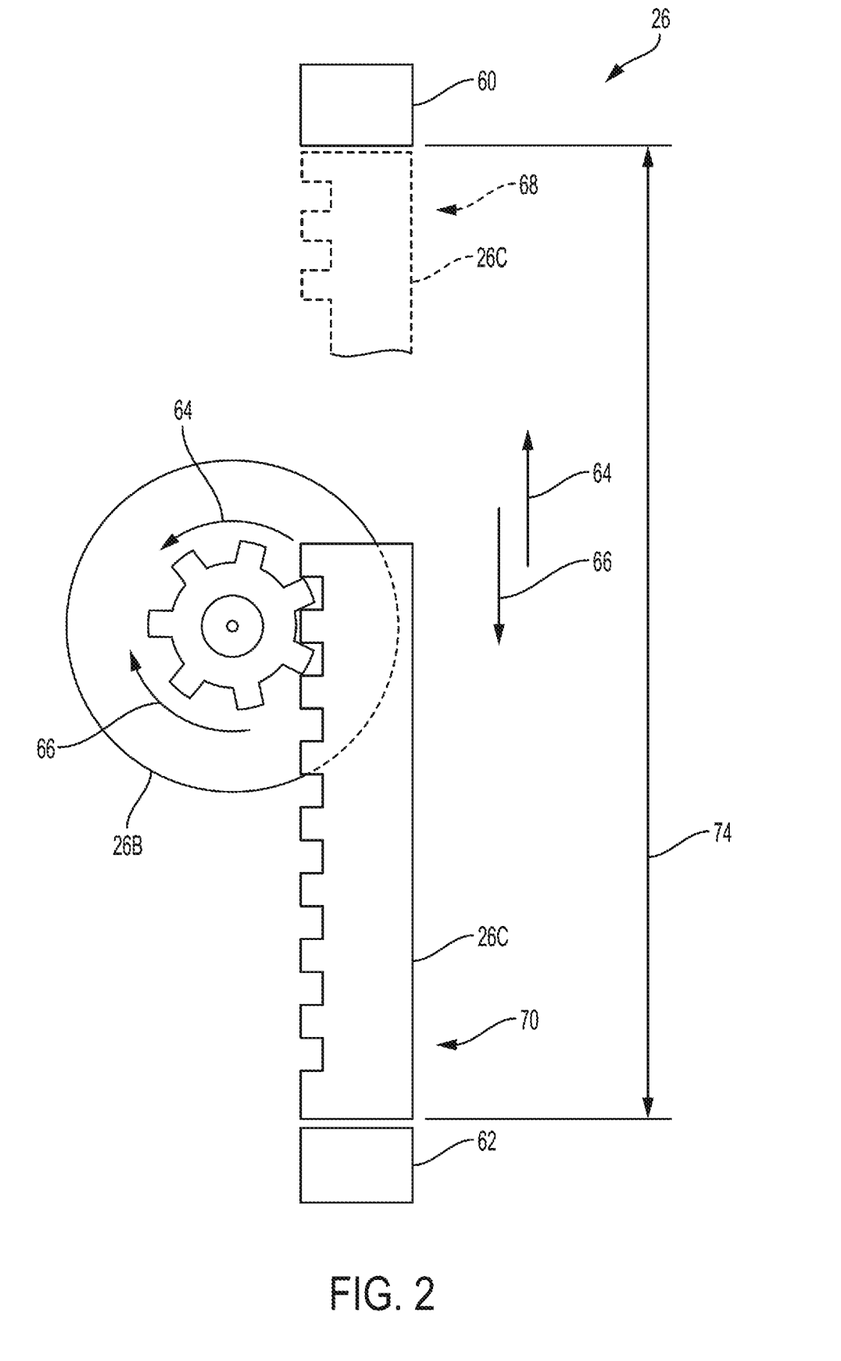
FIG. 2 is a schematic of a seed depth device of the agricultural planter illustrated in a home position and a fully extended position.
Figure 3:
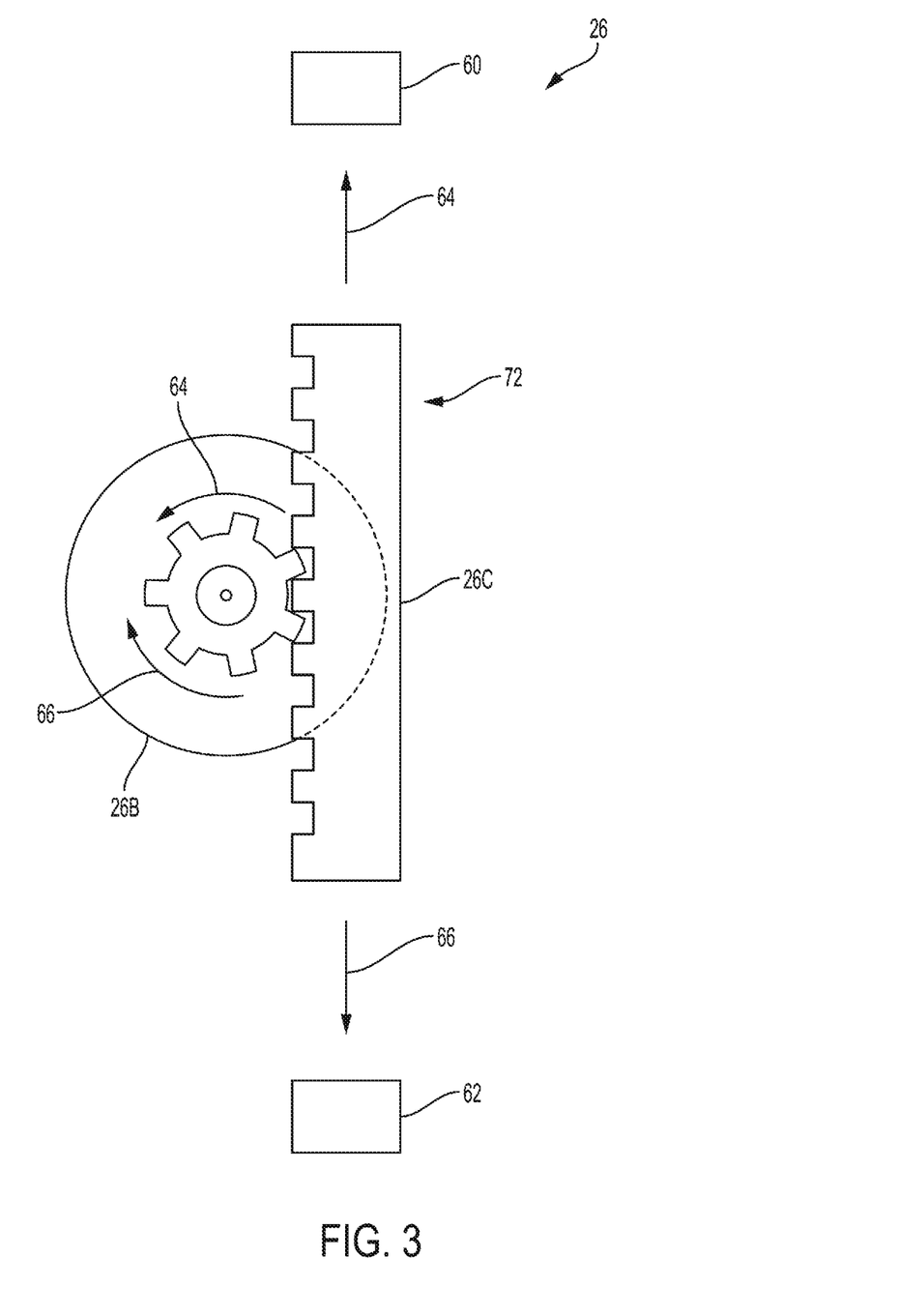
FIG. 3 is a schematic of the seed depth device similar to FIG. 2, but illustrated in an obstructed position.

Referring to FIGS. 2 and 3, the seed depth device 26 may include opposite stops 60, 62 with the actuator 26C generally traveling there-between. The stops 60, 62 may be spaced from one-another by a distance that is greater than a full travel distance 74 that the actuator 26C travels during normal operation. During normal operation, the seed depth device 26 may travel between, and includes, a home position 68 and a full extension position 70, see FIG. 2. In operation, the actuator 26C may be driven by the motor 26B in a positive direction (see arrow 64) toward the stop 60, and may be driven in an opposite negative direction (see arrow 66) toward the stop 62. When the actuator 26C is in the home position 68, the actuator 26C may be proximate to, but may not contact, the stop 60. When the actuator 26C is in the full extension position 70, the actuator 26C may be proximate to, but may not contact, the stop 62. During normal operation, the prevention of actuator 26C contact with either stop 60, 62 is generally controlled by the controller 26A (see FIG. 1) that knows the full travel distance 74, and prevents a stall scenario that may cause undesirable wear upon the seed depth device 26.

Figure 4:
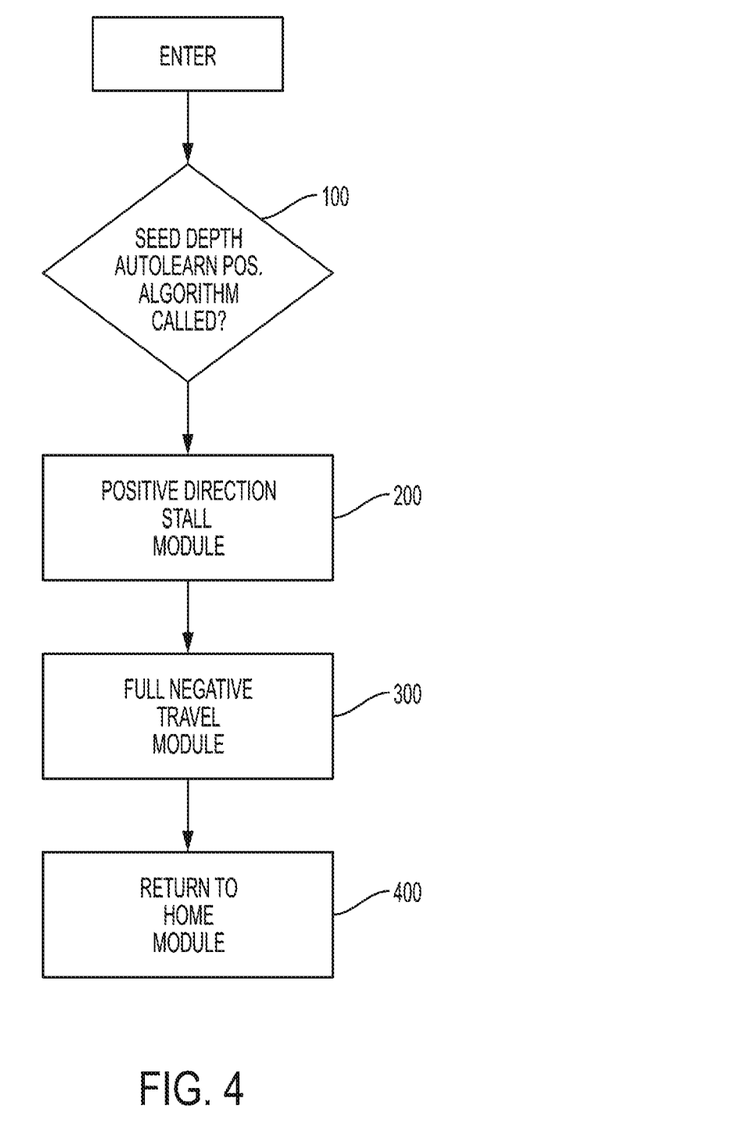
FIG. 4 is a schematic of a seed depth auto-learn system of the seed depth device.

Referring to FIG. 4, the seed depth device 26 also includes a seed depth auto-learn system 80 that may, at least in-part, be software based. The seed depth auto-learn system 80 may include a positive direction module 200, a full negative travel module 300, and a return to home module 400. The seed depth auto-learn system 80 may include, or is supported by, other components of the seed depth device 26 including the device controller 26A, the master controller 28, the stops 60, 62, and other components. The positive direction module 200 is generally configured to detect and record an "unverified" home position based on a stall condition. The full negative travel module 300 is generally configured to verify the home position or otherwise detect an impediment stall. The return to home module 400 is generally configured to detect any direction impediment stalls, and if no such stalls exist, then return the actuator 26C to the verified home position. It is contemplated and understood that the sequence of operation, or execution, of the modules 200, 300, 400 may be changed.

Referring to FIGS. 2 through 4, when the seed depth auto-learn system 80 is in operation, the seed depth device 26 is generally not operating normally as previously described. For example, when the system 80 is in operation, the actuator 26C may be intentionally "stalled" upon either of the stops 60, 62 (i.e., stop-stalled position) that is generally not the same as the home and full extension positions 68, 70. Moreover, when operating in the seed depth auto-learn system 80, the seed depth device, and/or the master controller 28, may be capable of recognizing an impediment-stalled position 72 (see FIG. 3) that may occur when, for example, an obstruction is in the path of actuator travel. The system 80 may be capable of overcoming such an impediment-stall during the process of learning seed depth travel.

Figure 5:
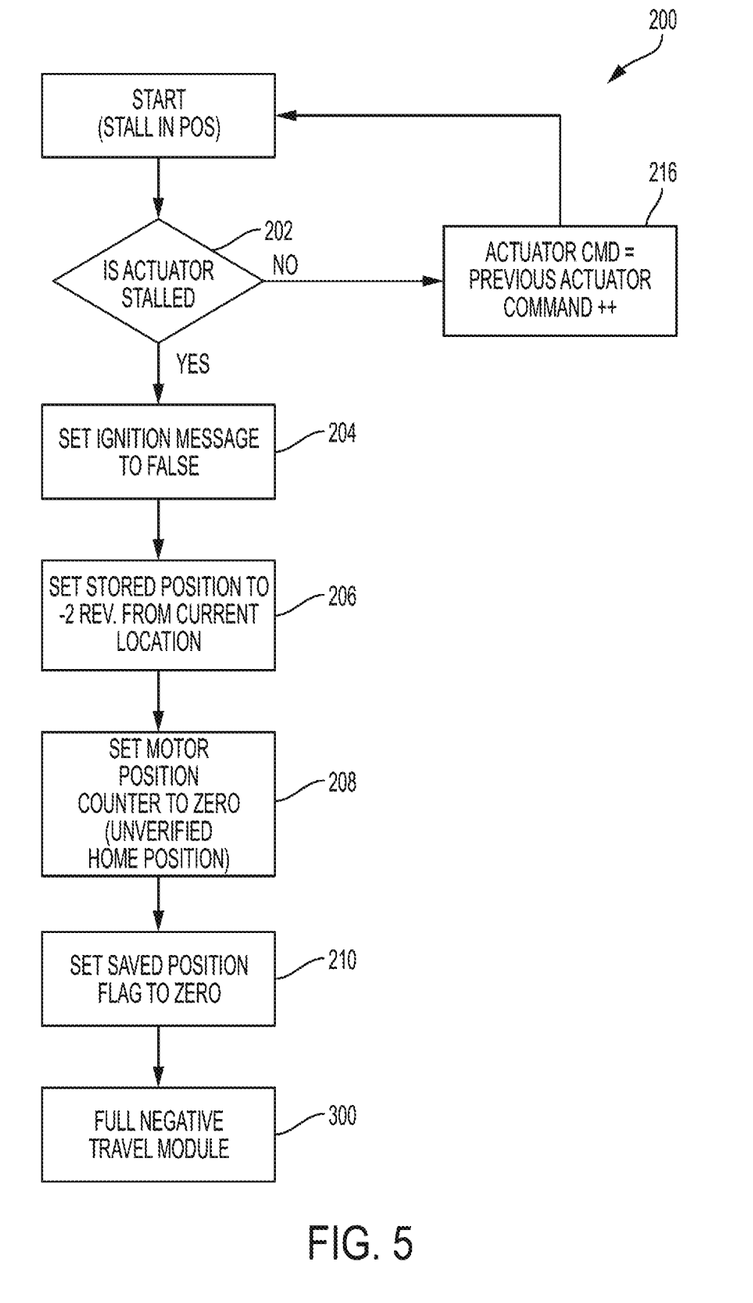
FIG. 5 is a flow diagram of a method of operating a positive direction stall module of the seed depth auto-learn system.

Referring to FIGS. 4 and 5, the seed depth auto-learn system 80 may initiate operation at block 100, wherein the system initiation is called by, for example, the master controller 28. At block 202, the positive direction stall module 200 may determine if the actuator 26C is stalled. The inquired stalled state would include the stop-stalled position (i.e., the actuator 26C makes contact with the stop 60) and the impediment-stalled position 72 previously described. If "yes" to block 202, and at block 204, the module 200 sets an ignition message to false that generally turns off the actuator to cease attempted motion. At block 206, the module 200 sets a stored, unverified, home position at a prescribed distance away from the current location (i.e., stalled position). The prescribed distance may be associated with a prescribed number of revolutions of the motor 26B. In the present example, the prescribed distance may be represented by a subtraction of about two revolutions where the total or full travel distance 74 (see FIG. 2) may be associated with about twenty-three revolutions of the motor 26B. In the present example, the negative two revolutions from the stop 60 is generally associated with the home position 68 previously described.

At block 208, the positive direction stall module 200 may set a motor position counter to zero (i.e., the unverified home position 68). This may be a reset where the controller 28 may remember the unverified home position 68. At block 210, the module 200 may set a saved position flag to zero. This setting may generally inform the master controller 28 that the actuator 26C is not yet fully setup, and therefore is not yet fully functional. After block 210, the seed depth auto-learn system 80 may advance to the full negative travel module 300. It is understood that the term "unverified" with reference to home position is an indication that the stop-stall may not have occurred via contact of the actuator 26C with the stop 60, but instead may be an unexpected and unknown impediment stall.

If "no" with regard to block 202, the positive direction module 200 may advance to block 216. At block 216, the module 200 may incrementally increase a previous actuator command, causing the actuator 26C to incrementally move further in the positive direction toward the stop 60. This is generally repeated until the actuator 26C is stop-stalled, not at, but proximate to the home position 68. Generally and at block 216, the actuator may not be stalled, but is not moving. The actuator 26C may not be moving because the initial command to move the actuator in the positive direction 64 may not have been large enough.

Figure 6:
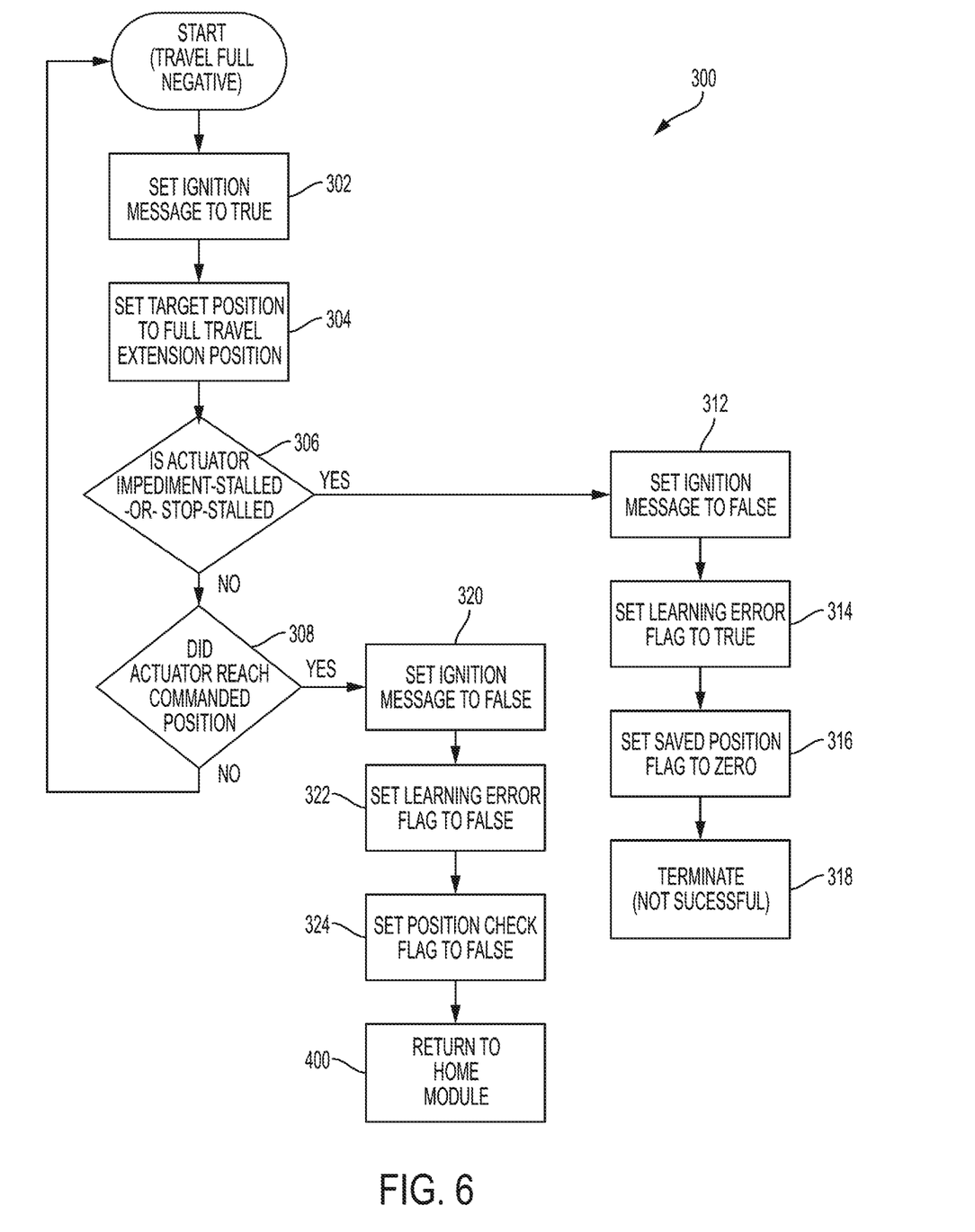
FIG. 6 is a flow diagram of a method of operating a full negative travel module of the seed depth auto-learn system.

Referring to FIG. 6, at block 302, the full negative travel module 300 may set an ignition message to true. This setting may generally turn on the device 26, or actuator 26C, to attempt motion. At block 304, the module 300 may set a target position to the full extension position. At block 306, the module 300 may determine if the actuator 26C is stalled. This stall may be a stop-stall wherein the actuator 26C makes contact with the second stop 62 because the original stall detected by the positive direction stall module 200 is an impediment-stall. Alternatively, the stall may be an impediment-stall. If "no" and at block 308, the module 300 may determine if the actuator 26C reached the commanded position (i.e., home position). If "no" with reference to block 308, the module 300 may return to start and/or block 302. In one scenario, block 308 may generally operate as an exit loop if, for example, the master controller 28 inadvertently goes off-line.

In general, block 306 addresses both types of stalls including an impediment stall and a stop-stall. If the actuator at block 306 is stalled via the stop-stall (i.e., contact of the actuator 26C with the stop 62), this indicates the stall detected by the positive direction stall module 200, which was assumed to be a stop-stall (i.e., contact of the actuator 26C against stop 60) is in actuality an impediment-stall. Therefore the "unverified" home position is not the "actual" home position at all, and execution of the seed depth auto-learn system 80 fails. The stops 60, 62 are fixed and positioned from one-another at a distance associated with the full actuator travel distance 74 that is constant, prescribed, and known by the controller 28.

If "yes" with regard to block 306 (i.e., the impediment-stall or a stop-stall), the full negative travel module 300 may advance to block 312. At block 312, the module 300 may set an ignition message to false. This setting may generally turn off the device 26, and/or generally cease any attempted motion of the actuator 26C. At block 314, the module 300 may set a learning error flag to true. This setting may initiate, for example, an error signal to the master controller 28. At block 316, the module 300 may set a saved position flag to zero. This may cause, for example, the master controller 28 not to use the associated seed depth device 26. Consequently and at block 318, the seed depth auto-learn system 80 may terminate since execution was not successful.

If "yes" with regard to block 308, this verifies that the previously unverified home position recorded my module 200 is the actual home position, and the full negative travel module 300 may advance to block 320. At block 320, the module 300 may set an ignition message to false. This may generally turn off the motor 26B. At block 322, the module 300 may set a learning error flag to false. This may inform the master controller 28 that not error exists. At block 324, the module 300 may set a position check flag to false. This may generally mean, and may inform the master controller 28, that the system 80 has not yet completed positioning of the seed depth device 26. After block 324, the seed depth auto-learn system 80 may proceed to the return to home module 400.

Figure 7:
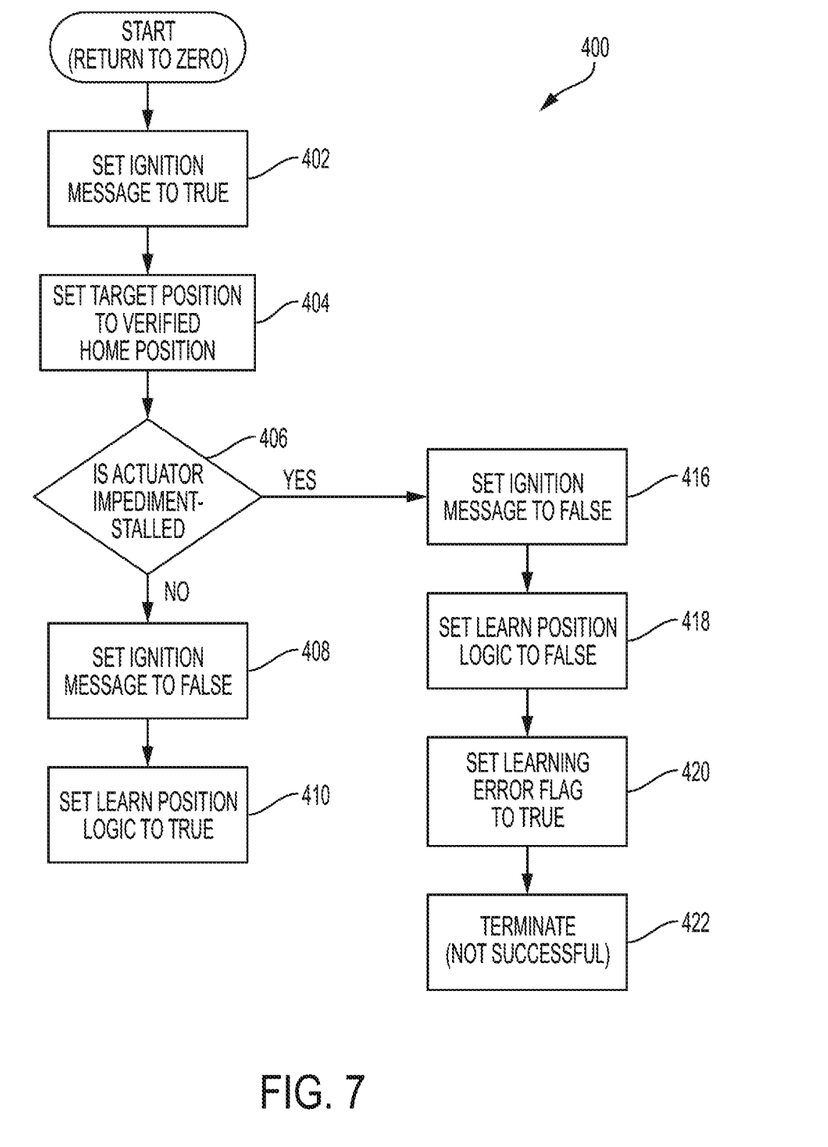
FIG. 7 is a flow diagram of a method of operating a return to home module.

Referring to FIG. 7 and at block 402, the return to home module 400 may start by setting an ignition message to true. This may generally start the motor 26B. At block 404, the module 400 may set a target position to the verified home position 68. At block 406, the module 400 may determine if the actuator 26C is impediment-stalled. For example, such an impediment-stall may be directional, or may not have existed at the time module 200 and/or module 300 were executed. If "no" with regard to block 406, the module 400 may advance to block 408. At block 408, the module 400 may set an ignition message to false that may generally turn off the actuator to cease attempted motion. At block 410, the module 400 may set the learn position logic to true. This generally informs the master controller 28 that the seed depth auto-learn system 80 has successfully completed execution. A user may be notified, via the user interface 30, that the determination of seed depth, or seed depth position, was successful.

If "yes" with regard to block 406, the return to home module 400 may advance to block 416. At block 416, the module 400 may set an ignition message to false that generally turns off the actuator to cease attempted motion. At block 418, the module 400 may set a learn position logic to false. This may generally inform the master controller 28 that the seed depth auto-learn system 80 did not learn the position correctly. At block 420, the module 400 may set a learning error flag to true. This setting may initiate, for example, an error signal to the master controller 28. At block 420, the seed depth auto-learn system 80 terminates as not being successful. A user may be notified, via the user interface 30, that the determination of seed depth, or seed depth positioning, was not successful.

Advantages and benefits of the present disclosure includes a system that supports an automated method of learning and establishing a home position of an actuator and then ensuring that full travel of the actuator has not been blocked.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or series of blocks in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A seed depth device for an agricultural planter comprising:
    an electric motor;
    an actuator driven by the electric motor and arranged to move to a home position;
    at least one controller including a computing processor and a computer readable storage medium configured to control the electric motor; and
    a seed depth auto-learn system at least in-part stored and executed by the at least one controller, the seed depth auto-learn system configured to learn the home position based at least in-part on the actuator stalling upon the first stop, wherein the seed depth auto-learn system is configured to move the actuator a prescribed distance away from the first stop to establish the home position.

2. The seed depth device set forth in claim 1, further comprising a first stop proximate to the actuator when in the home position, wherein the seed depth auto-learn system is configured to learn the home position based at least in-part on the actuator stalling upon the first stop.

3. The seed depth device set forth in claim 2, wherein the seed depth auto-learn system is configured to move the actuator a prescribed distance away from the first stop to establish the home position.

4. The seed depth device set forth in claim 3, wherein the seed depth auto-learn system is configured to iteratively move the actuator toward the first stop until the actuator contacts the first stop.

5. The seed depth device set forth in claim 2, further comprising a second stop spaced from the first stop by a distance greater than a full travel distance of the actuator and prescribe in the controller, the second stop being proximate to the actuator when in a full extension position of the actuator, wherein the seed depth auto-learn system is configured to determine the occurrence of an impediment-stall thereby determining successful completion of the execution.

6. The seed depth device set forth in claim 5, wherein the seed depth auto-learn system includes a positive direction stall module configured to:
   initiate a first positive motion of the seed depth device in a positive direction for a predetermined first distance,
   determine if the seed depth device is stalled,
   initiate a second positive motion in the positive direction for a predetermined second distance if not stalled,
   determine if the seed depth device is stalled, and
   record an unverified home position after the seed depth device has stalled.

7. The seed depth device set forth in claim 6, wherein the seed depth auto-learn system includes a full negative travel module configured to:
   initiate a negative motion of the seed depth device in a negative direction for the full travel distance,
   determine if the seed depth device is stalled upon cease of the negative motion, and
   terminate execution of the seed depth auto-learn system if the seed depth device is stalled upon cease of the negative motion, and
   verify the unverified home position if the seed depth device translated over the entire full travel distance.

8. The seed depth device set forth in claim 7, wherein the seed depth auto-learn system includes a return to home module configured to:
   initiate a third positive motion of the seed depth device in the positive direction and to the home position if the full negative travel module determines that the seed depth device has translated the full travel distance;
   determine if the seed depth device is impediment-stalled upon cease of third positive motion;
   record successful learning of seed depth positioning if the third positive motion is not impediment-stalled; and
   terminate learning of seed depth positioning if the third positive motion is impediment-stalled.

9. The seed depth device set forth in claim 8, wherein the positive direction stall module is configured to:
   establish a stalled position upon determination that the seed depth device is stalled, and
   initiate negative motion from the stalled position in a negative direction for a prescribed distance to establish the unverified home position, and to prevent stalling of the seed depth device during normal operation.

10. The seed depth device set forth in claim 9, wherein the initiation of the second positive motion is iterative.

11. The computer program product set forth in claim 9, wherein the predetermined first distance, the predetermined second distance, and the prescribed distance are associated with revolutions of the electric motor.

12. The computer program product set forth in claim 9, wherein the stalled position is indicative of a stop-stall or an impediment-stall.

* * * * *